Dec. 22, 1953
C. T. ASBURY
2,663,137
LAWN EDGER
Filed Aug. 1, 1951
2 Sheets-Sheet 1
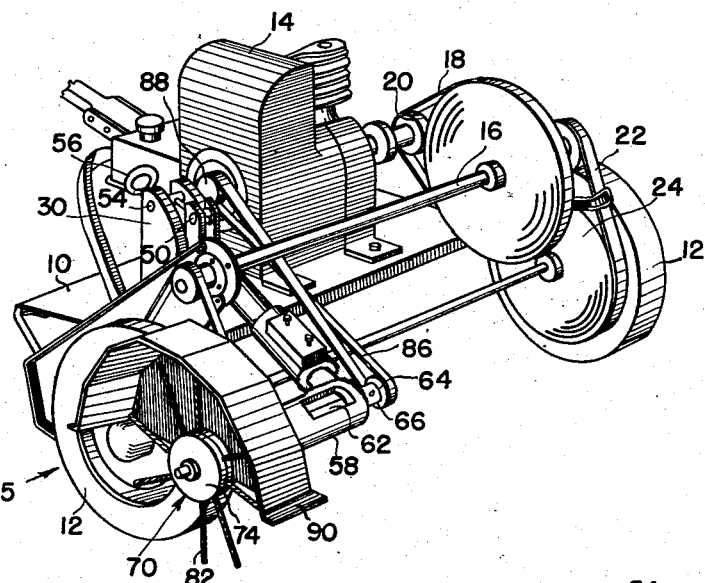
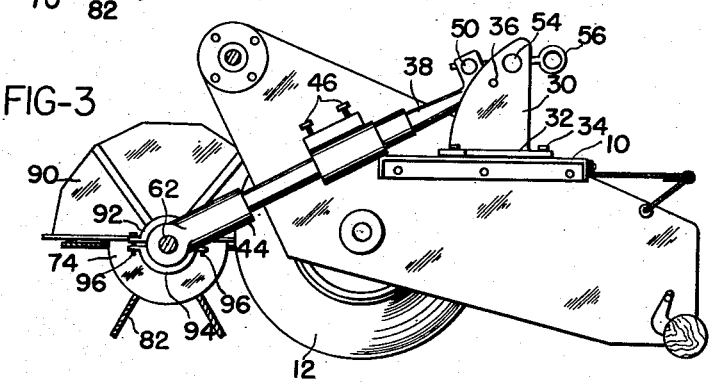
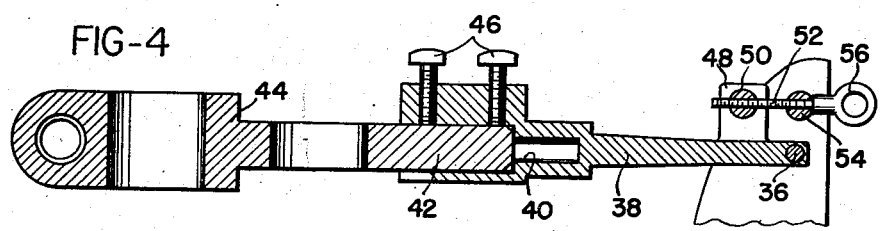
INVENTOR
CHARLES T. ASBURY
BY *Toulmin & Toulmin*
ATTORNEYS Dec. 22, 1953          C. T. ASBURY          2,663,137
LAWN EDGER
Filed Aug. 1, 1951                            2 Sheets-Sheet 2
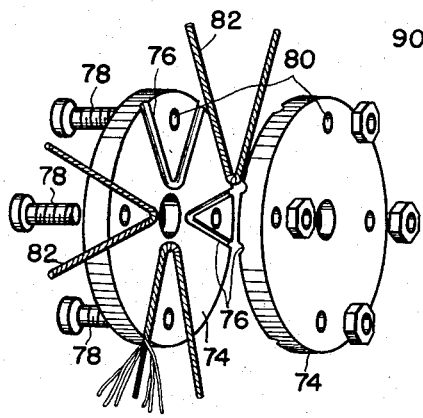
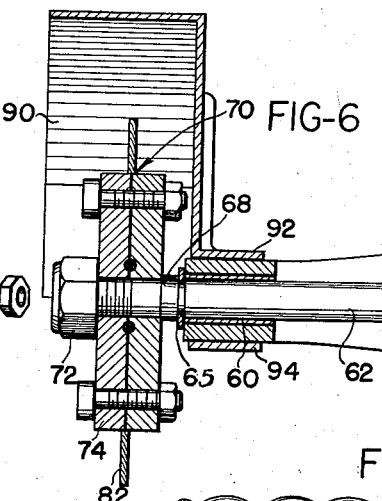
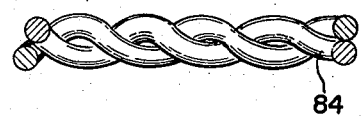
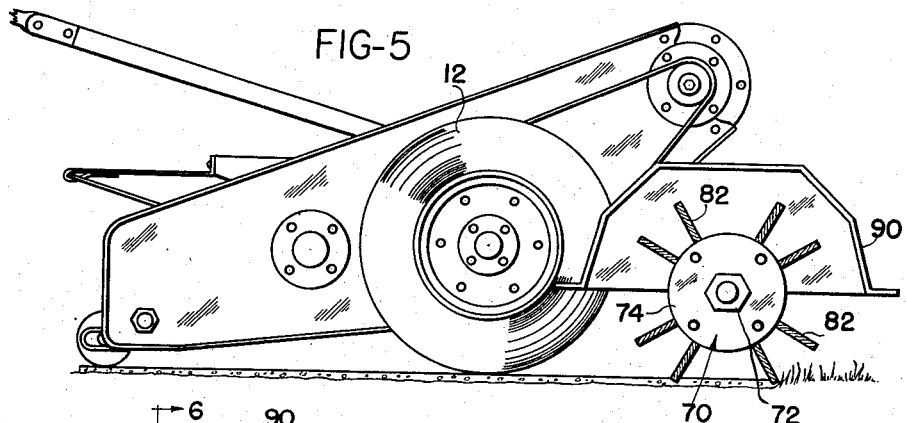
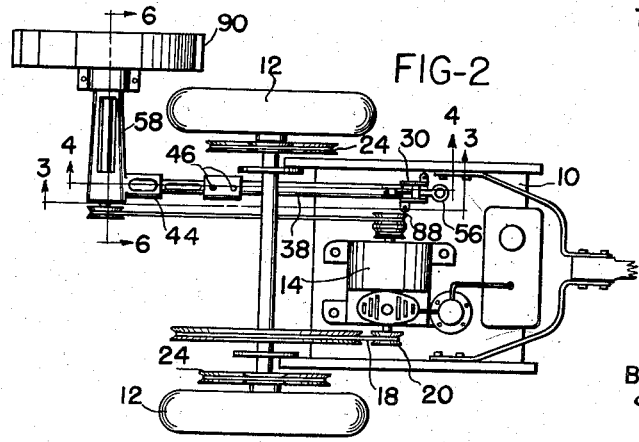
INVENTOR
CHARLES T. ASBURY
BY *Toulmin & Toulmin*
ATTORNEYS Patented Dec. 22, 1953

2,663,137

UNITED STATES PATENT OFFICE 2,663,137

LAWN EDGER

Charles T. Asbury, Fort Lauderdale, Fla., assignor to Asbury Corporation, Wilmington, Del., a corporation of Delaware Application August 1, 1951, Serial No. 239,806

7 Claims. (Cl. 56—295)

This invention relates to equipment for maintaining lawns and, particularly, to an edging device for edging lawns along concrete driveways, sidewalks and the like.

In the maintaining of lawns of any substantial size, such as those of the size large enough to require the use of a power mower, one of the tasks that has always been particularly troublesome and laborious is that of edging the lawn along concrete strips such as drives and sidewalks and around flower beds and the like.

It has been attempted to deal with this problem by cutting grooves in the ground adjacent the concrete strips but this has not proved to be satisfactory because such grooves form gutters where soil erosion may readily take place during a period of heavy rainfall, and likewise tend to become ragged and uneven in appearance and require considerable labor to maintain. Furthermore, such gutters will collect seeds and form a ready place where undesirable weed growths can commence.

Other attempts have been made to deal with this problem by providing disc type cutters which cut along the edge of a concrete strip and in this manner effect a trimming of the edge of the lawn. The principal difficulty with a disc type arrangement of the nature referred to is that it cuts in a sharp line making it necessary to run a mower quite close to the concrete strip in order to effect trimming of the grass and this sometimes leads to damaging of the reel of the mower or the cutter bar thereof.

The instant invention deals with a lawn edger of a type which can be mounted on a lawn mower to be driven thereby.

The lawn edger of the present invention offers as advantages over lawn edgers of the prior art, lighter frame construction, more convenient adjustability of the edging device, ready adaptability of the device to substantially any type of power mower, and more inexpensive construction, particularly as regards the edging tool per se which actually operates on the lawn.

In addition to the foregoing advantages, it is a particular objective of the present invention to provide a lawn edger in which the edging tool is of a nature which is inexpensive to construct and which can readily be maintained and which will operate in a manner so as to produce a superior result.

The foregoing objects and advantages and still other objects and advantages will become more evident during the following description taken in connection with the accompanying drawings in which:

Figure 1 is a perspective view showing a power mower having a lawn edging device according to my invention mounted thereon;

Figure 2 is a plan view looking down on top of the arrangement of Figure 1;

Figure 3 is a sectional view indicated by lines 3—3 on Figure 2;

Figure 4 is an enlarged sectional view taken along the main supporting arm of the device and is indicated by line 4—4 on Figure 2;

Figure 5 is a side elevational view of the power mower and the device mounted thereon and is indicated by the arrow 5 on Figure 1;

Figure 6 is an enlarged sectional view taken along the drive shaft of the edging device and is indicated by line 6—6 on Figure 2;

Figure 7 is a perspective view showing the preferred form which the edging tool takes according to this invention, and Figure 8 is an enlarged perspective view showing the preferred form of cutting element for mounting in the holder illustrated in Figure 7.

Referring to the drawings somewhat more in detail there is illustrated in Figure 1 a power mower of substantially any conventional design and generally comprising a frame that includes a top plate 10 supported on the ground wheels 12 and which in turn supports a drive motor 14. The lawn mower comprises the usual cutter arrangement, such as the rotary reel and cutter bar (not illustrated) and means are provided for driving either the wheels 12 or the cutting arrangement or both thereof in the form of the shaft 16 that is belted as by belt 18 to pulley 20 of the motor and which shaft is in turn belted by the drive belt 22 to the pulley 24, mounted on the wheel or the reel of the mower.

According to the present invention there is mounted on the top panel 10, a substantially U-shaped bracket 30 which may be secured to top panel 10 as by the mounting flange 32 and bolts 34.

Between the up-standing side plates of U-shaped bracket 30 there is pivoted by means of the pivot shaft 36, a portion 38 of a support arm projecting forwardly toward the front of the mower. At its front end, portion 38 is bored at 40 for receiving the cylindrical rear end 42 of a second portion 44 of the support arm. Lock screws 46 may be provided for clamping cylindrical portion 42 in any desired position of adjustment within bore 40 so that the two portions of the support arm can be extended or telescoped together to any desired degree or so the forward portion 44 of the support arm can be rotated to any desired position of angularity relative to the portion 38, of the support arm.

Portion 38 of the support arm at its rear end comprises a pair of up-standing ears 48, between which is pivoted a rod 50 that is drilled and tapped for receiving screw 52 that passes through a similar rod 54, carried between the side plates of bracket 30 but which is drilled with a clearance ball for passing screw 52. On screw 52 on the opposite side of rod 54 from rod 50 there is a knob 56 by means of which the screw can be rotated. In this manner the entire support arm can be rocked up and down about its pivotal support 36 and thus position the forward or working end of the edging device at any desired elevation.

At its forwardmost end, portion 44 of the support arm has a laterally extending part 58, best seen in Figures 2 and 6 and which part 58 provides spaced journals 60 for supporting the rotary drive shaft 62 of the edging device. Rightwardly of part 58, that is toward the center of the mower, there is mounted on the end of shaft 62 a drive pulley 64 pinned thereto as by the pin 66. Leftwardly of the end of part 50, shaft 62 may advantageously be grooved to receive snap ring 65. Snap ring 65 and pulley 64 serve to maintain shaft 62 against any substantial axial movement in part 58.

Outwardly beyond snap ring 65, shaft 62 is shouldered as indicated at 68 and abutting the shoulder is the edging tool proper generally indicated at 70 and which is retained in position by nut 72 threaded on to the threaded outer end of shaft 62.

The edging tool 70, as will best be seen in Figure 7, comprises a pair of plates 74 and each of which has on its inner face a plurality of U-shaped or V-shaped substantially half round grooves 76. These grooves are adapted for registering when the plates are brought together and the clamp bolts 78 are passed through the bores 80 so that the said grooves are adapted for supporting the correspondingly shaped pieces of twisted wire or cable indicated at 82 and forming the cutting elements of the edging tool.

This particular feature of my invention wherein the plates 74 form a holder for the cutting elements proper and which elements are in the form of twisted wires or cables is an important feature because, heretofore, edging devices have required special sharp cutting tools or special brushes. Whenever special tools of this nature are provided, the expense of the edger is substantially increased and many times it is extremely difficult to find a reliable source of supply for specialty items of this nature. According to the present invention all of these difficulties are avoided by utilizing the holder and cutting element arrangement as illustrated in Figure 7. Twisted wires and cables of the nature which can be used are always in good supply and no difficulty is ever experienced in making up the edging tool initially at the time of manufacture, or in procuring replacement cutting elements for mounting in the holders. Similarly, the holders can be quite readily manufactured from readily available stocks of metal and may, if so desired, be formed of heavy sheet metal pressed to the proper configuration.

In addition to the particular edging tool which I disclose in this application, having the several advantages enumerated above, I have found that it operates to produce superior results in connection with the edging of a lawn. It appears that the cutting elements as I disclose them in this application are resilient enough to withstand all of the abuse normally encountered in contrast to a conventional sharp end edging tool which readily becomes dull from striking the cement and stones and commences to operate inefficiently after a short period of time. At the same time the cutting element according to the present invention is stiff enough to operate satisfactorily even in hardground and with heavy growths of grass.

A conventional wire brush, on the other hand is, so yielding that it sometimes does not operate properly on hard spots in the ground and the individual wires of such a brush have a tendency to become readily bent and worn so that the brush itself frays out. The cutting or edging tool according to the present invention avoids these drawbacks and works equally well in hard and soft ground and the cutting elements provided by the twisted wires or cables show no tendency to be deflected under all normal circumstances.

The cutting elements 82 may be formed of any suitably stiff wire cable, but I have found it convenient to employ a pair of twisted wires as I illustrate in Figure 8, at 84. These two wires in their twisted relation appear to support and sustain one another and the two wires twisted together in the manner illustrated, offer a cutting element greatly improved over any arrangement that could be made of the same two wires individually.

Returning now to the driving of the edging tool, the pulley 64, previously referred to, is connected by a belt 86, with an out-pulley 88 on the output shaft of motor 14. It will be understood that pulley 64, could be driven in other manners, as, for example, by means of a pulley mounted on countershaft 16, but it is of advantage to arrange pulley 64 to be driven by a pulley as at 88 which is substantially co-axial with the pivot means 36, for the support arm so that raising and lowering movements of the edging tool can be had without any material change in the tightness of belt 86.

There is preferably arranged about at least the upper half of the cutting device a guard or shield 90 which may advantageously be cast, or formed of sheet metal, and which includes a hub part 92 adapted for being clamped about one end of part 58 as by means of the strap 94 and the bolt 96.

It will be evident that the device according to my invention provides a ready means whereby the support arm can be changed in length in order to accommodate the edging device to drive belts of slightly different length; the working end of the device can be tilted to present the cutting device to the ground at any predetermined angle, and the entire support arm can be pivoted about its pivotal support in order to raise and lower the cutting device.

From the foregoing it will be evident that the invention which I disclose in this application provides for improved edging tool for lawns and the like, particularly adapted for being mounted on a power mower for being driven thereby and characterized as being light, readily adjustable, and extremely flexible in that it includes a plurality of adjustments, and particularly characterized in the improved cutting tool described above.

It will be understood that this invention is susceptible to modification in order to adapt it to different usages and conditions, and, accordingly, it is desired to comprehend such modifications within this invention as may fall within the scope of the appended claims.

I claim:

1. In a lawn edging device; an arm, means at one end of the arm for pivotal connection of the said arm with a mower or the like, a shaft journaled on the other end of said arm and extending in a direction transverse to the axis of the arm, and a cutting member fixed to one end of said shaft, said cutting member comprising a central holder portion, and a plurality of substantially V-shaped pieces of twisted wire cable secured to said holder portion with the ends of said cable projecting substantially radially outwardly therefrom to form semi-rigid cutting elements.

2. In a lawn edger of the nature described; a bracket having spaced ears, a support arm extending between said ears and pivoted to said bracket, a shaft journaled on the other end of said arm on an axis transverse to the axis of said beam, a cutting tool on one end of said shaft, means for driving said shaft in rotation, a block pivoted in each said bracket and arm on an axis parallel with the axis of the pivotal connection of said arm with said bracket, and a screw passing freely through one of said blocks and screw threaded in the other thereof for adjusting the angular position of said arm relative to said bracket, and for limiting the downward movement of the arm while permitting upward movement thereof.

3. In a lawn edger of the nature described; a bracket having spaced ears, a support arm extending between said ears and pivoted to said bracket, a shaft journaled on the other end of said arm on an axis transverse to the axis of said arm, a cutting tool on one end of said shaft, means for driving said shaft in rotation, a block pivoted in each said bracket and arm on an axis parallel with the axis of the pivotal connection of said arm with said bracket, and a screw passing freely through one of said blocks and screw threaded in the other thereof for adjusting the angular position of said arm relative to said bracket, said screw having a shoulder abutting the one of said blocks through which it passes freely, whereby said arm can pivot relative to said bracket in upward movements, but is positively restrained against pivoting relative to said bracket in the downward direction.

4. In a cutting tool for a lawn edger of the nature described; a pair of plates adapted for being clamped together in predetermined relationship, a series of substantially half round V-shaped grooves in each of said plates in registration with each other and with the apices of said grooves toward the center of the hub, and a substantially V-shaped twisted wire, cutting element disposed in each of said grooves with the free ends thereof projecting substantially, radially, outwardly from the periphery of the said hub.

5. In a cutting tool for a lawn edger of the nature described; a pair of circular plates, a plurality of V-shaped grooves in the inner face of each plate, said grooves having their apices directed toward the center of the said plates, means for clamping said plates together with the said grooves in registration, and cutting elements in said grooves comprising length of wire cable bent to a V formation and having their ends projecting from about the periphery of said plates.

6. In a cutting tool for a lawn edger of the nature described; a pair of circular plates, a plurality of V-shaped grooves in the inner face of each plate, said grooves having their apices directed toward the center of the said plates, means for clamping said plates together with the said grooves in registration, and cutting elements in said grooves comprising length of wire cable bent to a V formation and having their ends projecting from about the periphery of said plates, said means for clamping said plates together comprising bolts extending through said plates between the legs of each of the V-shaped cutting elements.

7. In a cutting tool for a lawn edger of the nature described; a holder forming a hub adapted for being mounted on a shaft, and V shaped wire cutting elements clamped in said hub with the ends thereof projecting substantially radially from the hub, each said cutting element comprising a pair of relatively stiff wires twisted together, each of said wires being on the order of one sixteenth of an inch in diameter, and each said cutting element projecting from the periphery of the hub, on the order of from two to four inches, whereby a semi-rigid but yielding cutting element is provided.

CHARLES T. ASBURY.

References Cited in the file of this patent

UNITED STATES PATENTS

| Number | Name | Date |
|---|---|---|
| 1,970,302 | Gerhardt | Aug. 14, 1934 |
| 2,480,877 | Peterson | Sept. 6, 1949 |
| 2,521,033 | Bell | Sept. 5, 1950 |
| 2,538,230 | Boggs | Jan. 16, 1951 |